Aug. 25, 1942.    S. BAKEWELL    2,293,963
TENDERIZING DEVICE
Filed March 25, 1939    2 Sheets-Sheet 1
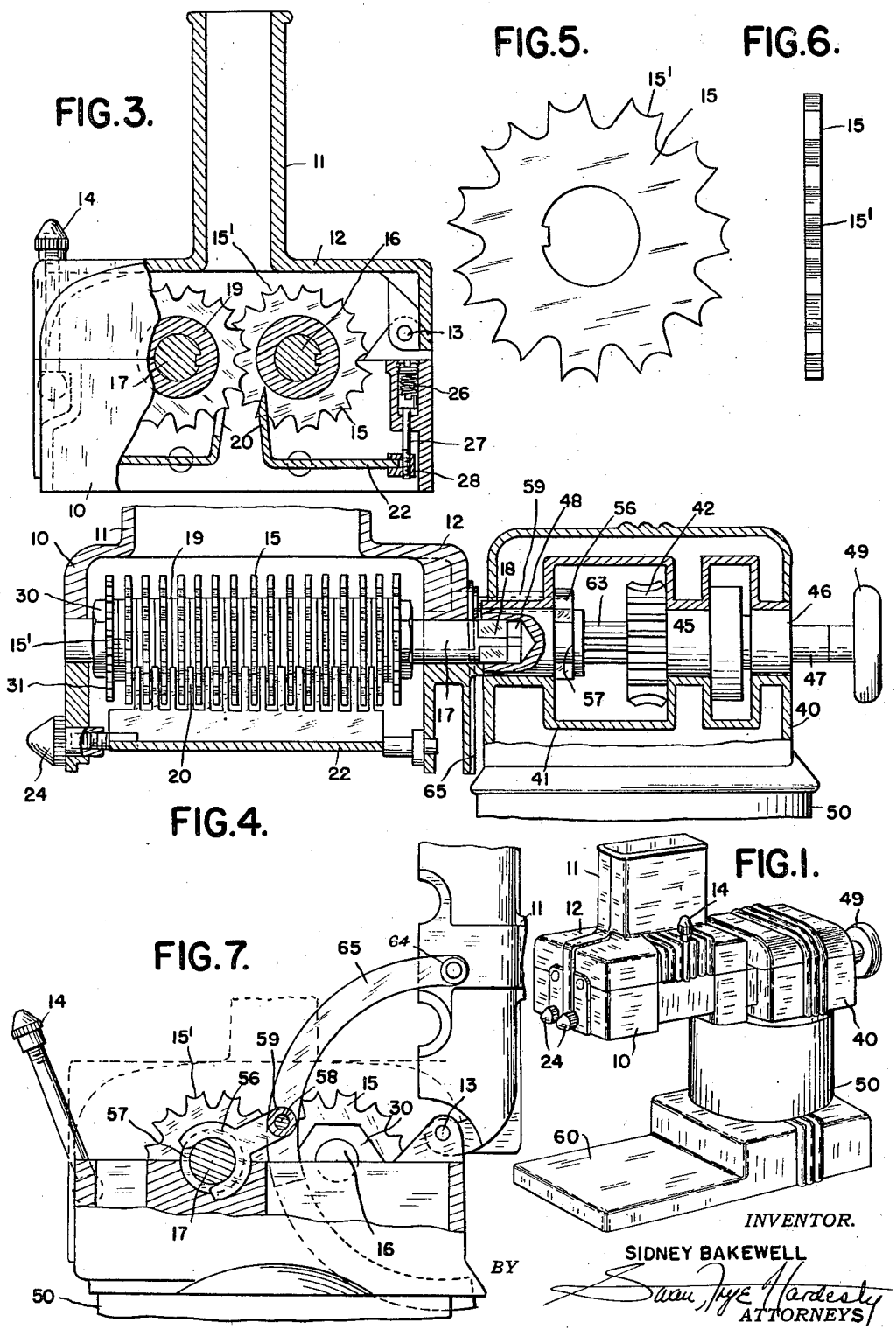
INVENTOR.
SIDNEY BAKEWELL
BY
ATTORNEYS Aug. 25, 1942.                S. BAKEWELL                    2,293,963
                            TENDERIZING DEVICE
                        Filed March 25, 1939         2 Sheets-Sheet 2
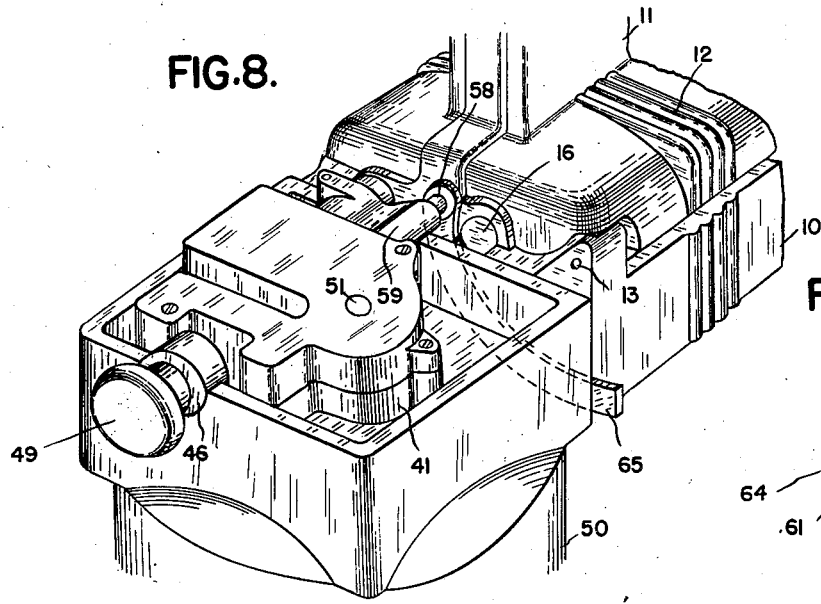
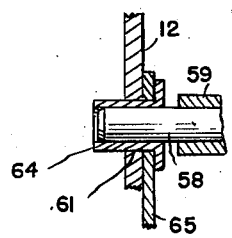
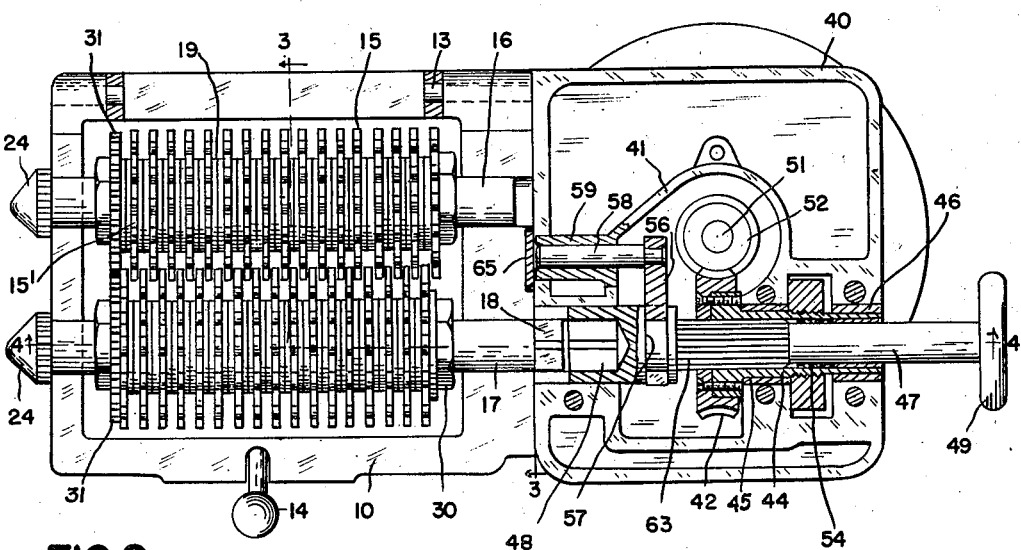
INVENTOR.
SIDNEY BAKEWELL
BY
ATTORNEYS Patented Aug. 25, 1942

2,293,963

UNITED STATES PATENT OFFICE 2,293,963

TENDERIZING DEVICE

Sidney Bakewell, Detroit, Mich.

Application March 25, 1939, Serial No. 264,085

3 Claims. (Cl. 192—135)

This invention relates to meat tenderizing devices, and particularly to tenderizers of that class in which coacting revolvable members are employed to effect the tenderization.

An important object sought is to provide means whereby meat may be crushed and pulled in a manner which results in thorough tenderizing, without mangling, cutting and distorting the meat in the way usually caused by tenderizers of this class.

The escape of the natural juices, and the almost complete severance of the meat into small segments, which result from tenderizing by presently known means, cause the meat to be dried out, upon heating, rather than properly cooked. A related object of the present invention, therefore, is to provide in such a device improved tenderizing elements, so formed as to penetrate the meat to a certain extent, and to crush the fibers both near the surface and in the interior of the meat, without, however, so cutting up or mangling the meat as to interfere with proper cooking or allow undue escape of the natural juices.

In rotary tenderizing devices of the sort using relatively thin blades which cut the meat, trouble has been encountered due to breaking of parts of the teeth by engagement with bone or other hard substances in the meat. Pieces of the broken teeth, remaining embedded in the meat, are of course a menace to the consumer. A further and most important object of the present invention, therefore, is to virtually eliminate all possibility of such breakage of teeth, while at the same time providing tenderizing elements having an improved crushing and pulling action rather than a cutting action, as stated.

A further object is to provide such a tenderizing device which is simpler and less expensive in construction than those now in use, which is easily disassemblable for cleaning and repair, and which incorporates improved safeguards adapted to prevent accidental injury to the operator.

Still another object is to incorporate in a device of this character improved combined stripper and guard means arranged to prevent the meat from clinging to or wrapping around the treating rollers, and also to prevent accidental engagement with such rollers by the hands of the operator.

A further object is to provide in a tenderizing device of the character indicated, in conjunction with power driving means, an improved safety interlocking mechanism, so interconnected with the cover portion of the casing for the tenderizing rollers that it is impossible to open such casing or gain access to the treating rollers while the power driving means is operatively connected to the tenderizing elements. A further object is to provide such a safety mechanism which, upon disconnection of the power driving means from the tenderizing elements, releases the locking means, permitting the casing to be opened, but which, when such casing is opened, automatically renders it impossible to reconnect the power driving means to the tenderizing elements, and prevents such reconnection as long as the casing remains open.

A further object is to provide such an automatic safety locking mechanism which is of very simple and inexpensive construction, and of such rugged nature that it is virtually impossible to put the same out of operation.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of an improved power driven tenderizing device constructed in accordance with the present invention.

Figure 2 is a plan view thereof with the covers removed from the tenderizer unit and transmission and safety locking mechanism, parts being broken away to show the same in section.

Figure 3 is a vertical section taken substantially on the line 3—3 of Figure 2, and looking in the direction of the arrows.

Figure 4 is a section taken substantially on the line 4—4 of Figure 2, and looking in the direction of the arrows, but with the driving means engaged.

Figures 5 and 6 are side and edge views respectively of one of the tenderizing elements removed from the assembly.

Figure 7 is a side elevational view of the tenderizing mechanism, partly broken away, showing the action of certain of the interlocking parts.

Figure 8 is a perspective view of the upper portion of the driving mechanism and the tenderizing assembly, showing the arrangement of the locking parts; and Figure 9 is a fragmentary sectional detail of the cover-holding element, and adjacent portion of the cover of the tenderizing element, shown in locked position.

Referring now to the drawings:

Reference character 10 designates a substantially rectangular box-like container, open at its bottom, having an upwardly projecting and relatively narrow feeding neck 11 in its top. The top is formed as a cover 12, hinged along the back of the casing upon pins 13. A suitable clamp fastener as 14 may be provided to hold the lid tightly closed.

The meat treating assembly will be seen to consist of a pair of rollers, each comprising a plurality of toothed discs 15 and interposed cylindrical spacers 19. These are keyed upon their respective shafts 16, 17, and removably held in place as by nuts 30. The tenderizing discs of the two rollers are uniformly spaced and fit freely between one another, substantially to the extent shown. The shafts 16, 17 are journaled in plain bearings formed half in the body and half in the cover of the casing, so that the rollers may be lifted out of the assembly when the cover is open. Gears 31 transmit rotation from the driving roller shaft 16 to the driven shaft 17.

The shape of the tenderizing teeth, best shown in Figure 5, is such that one of the two spaced pointed extremities first pierces and enters the meat (which piercing is accomplished easily and without mangling the work, because of the sharp contour of this portion of the tooth), while thereafter the inclined side of the other projection of the same tooth is forced against the work in a manner to squeeze it, the grip of the opposed teeth of the opposite treating member also tending to pull or stretch the meat while performing a similar crushing action in the opposite direction. The depressions 15' between the pointed extremities, being flat and of substantial width, and of less depth than the spaces between the teeth, act to crush the fibers of the meat without undue cutting thereof.

Bearing against the spacer portions of each roller, between the discs, are stripping fingers 20 carried in appropriately spaced upwardly projecting relation by the inner edges of guard plates 22. Such plates will be seen to be centrally spaced from each other sufficiently to allow the meat to pass downwardly therebetween, the stripping fingers guiding the work. The plates substantially close the bottom of the casing preventing accidental engagement with the rollers. Each plate 22 is pivoted in the casing upon a longitudinal axis, the outer trunnion bearing for each, to permit its easy removal, being formed as an apertured thumb screw 24. Yieldable engagement between the fingers 20 and the rollers is maintained by springs as 26, each trapped in a well formed to receive it in a casing, and bearing downwardly against a plunger 27 carrying a slotted bracket 28 into which the rear edge of the rockable shield is loosely fitted.

The casing 10 is attached to and supported by the adjacent casing section 40 which houses the transmission mechanism, and is in turn supported by the motor housing 50, the latter being mounted in vertical position upon a base 60.

The casing 50 may contain an electric motor or other suitable power driving means (unshown). The motor shaft 51 projects upwardly into the transmission casing 40, where it carries a worm 52 meshing with worm wheel 42, fast upon a sleeve 44 journaled in bearings 45, 46. These parts will be seen to be axially aligned with the roller shaft 17, which projects into the casing 40, having a squared end 18 engageable in a conformably shaped socket 48 fast upon and shown as formed integrally with the longitudinally slidable shaft 47, mounted in the sleeve 44 and drivable thereby as through splines 63. An end of shaft 47 projects from the casing to carry a knob 49, by means of which the shaft may be slid to connect and disconnect the socket 48 with respect to the shaft 17. An inner casing 41 enclosing the gears may serve as an oil well, a felt or other suitable bushing 54 being preferably provided upon the shaft 47 to prevent escape of oil therealong.

The safety locking mechanism for the cover 12 is operated, by sliding movement of the shaft 47, through the agency of a yoke 56 engaging in a slot 57 in shaft 47 and attached to a locking pin 58, which is thereby slidable concurrently with longitudinal movement of the shaft 47 in a suitable bearing portion 59 formed in the wall of casing portion 40 adjacent the cover 12 of the tenderizer casing. An aperture 61 is formed in the cover in position to receive the pin 58 when the cover is closed, the pin then acting to lock the cover in closed position. At such time the pin projects through a bushing 64 in the hole 61, which bushing also serves as attaching means for securing to the cover a segmental blocking member 65. When the pin 58 is released and the cover 12 opened, the blocking member 65 swings in the path of the pin 58, preventing inward movement thereof while the cover is open. Through the agency of yoke 56 this will be seen to prevent movement of shaft 47, and positively maintains the socket 48 disengaged from the squared end 18 of shaft 17. It is thus impossible to clutch the tenderizer rolls to the driving mechanism while the cover 12 is open, while when the cover is closed, and the driving means clutched to the rolls, it is impossible to open the cover to gain access to the rolls.

I claim:

1. Safety means for preventing access to potentially dangerous operable food treating elements or the like while said elements are in operation, but adapted to permit access to such elements at desired times, comprising in combination with a casing and an openable cover for enclosing said elements, and power driving means for said elements, means interconnecting the cover and driving means and controlling the interconnection thereof as well as the operation of said operable elements comprising shiftable means for making and breaking a driving connection between said driving means and operable elements, and locking means connected to said shiftable means and engageable with and disengageable from the cover as the shiftable means is moved to make and break said driving connection, and to hold the cover closed when said shiftable means is in position to make said driving connection, a shaft extending into said casing to drive said treating elements, clutching means for making and breaking a driving connection between said shaft and driving means, shiftable means for operating said clutching means, a locking member movable concurrently with said shiftable means and operable thereby to and from locking engagement with the cover when the latter is closed, concurrently with making and breaking of said driving connection, respectively, and a blocking portion carried by said cover and movable in the path of said locking member when the cover is open, and in all open positions of the cover, to positively prevent engagement of said clutching means.

2. Safety means for preventing access to potentially dangerous operable food treating elements or the like while said elements are in operation, but adapted to permit access to such elements at desired times, comprising in combination with a casing and an openable cover for enclosing said elements, and power driving means for said elements, means interconnecting the cover and driving means and controlling the interconnection thereof as well as the operation of said operable elements comprising shiftable means for making and breaking a driving connection between said driving means and operable elements, and locking means connected to said shiftable means and engageable with and disengageable from the cover as the shiftable means is moved to make and break said driving connection, and to hold the cover closed when said shiftable means is in position to make said driving connection, a shaft extending into said casing to drive said treating elements, clutching means for making and breaking a driving connection between said shaft and driving means, shiftable means for operating said clutching means, a locking member movable by said shiftable means to and from locking engagement with the cover when the latter is closed, concurrently with making and breaking of said driving connection, and a blocking portion carried by said cover and lying in the path of said locking member when the cover is in all positions other than closed, said blocking portion also at such time preventing movement of such clutching means to a position to make such driving connection.

3. Safety means for preventing access to potentially dangerous operable food treating elements or the like while said elements are in operation, but adapted to permit access to such elements at desired times, comprising in combination with a casing and a hinged cover for enclosing said operable elements, and power driving means for said elements, means interconnecting the cover and driving means and controlling the interconnection thereof, and also controlling the operation of said operable elements, comprising a clutch having a portion shiftable to make and break a driving connection between said driving means and operable elements, a bolt laterally movable to and from engagement with said cover when the latter is closed to hold the same in clutched position, said bolt and shiftable portion of the clutch being interconnected for concurrent movement, and neither being movable independently of the other, and a blocking portion carried by and movable with the cover and lying in the path of said bolt when the cover is in all positions other than closed, to prevent movement of the bolt to the locking position, and thereby to prevent engagement of the clutch.

SIDNEY BAKEWELL.